Oct. 8, 1963     A. SCHLANGER     3,106,183
VALVE CAP PRESSURE INDICATOR FOR TIRES
Filed Sept. 4, 1962     2 Sheets-Sheet 1
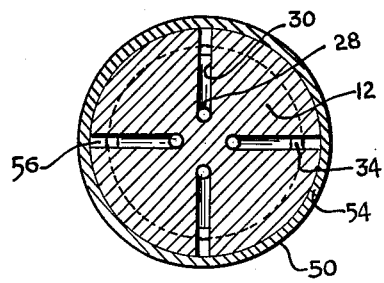
Fig. 1.
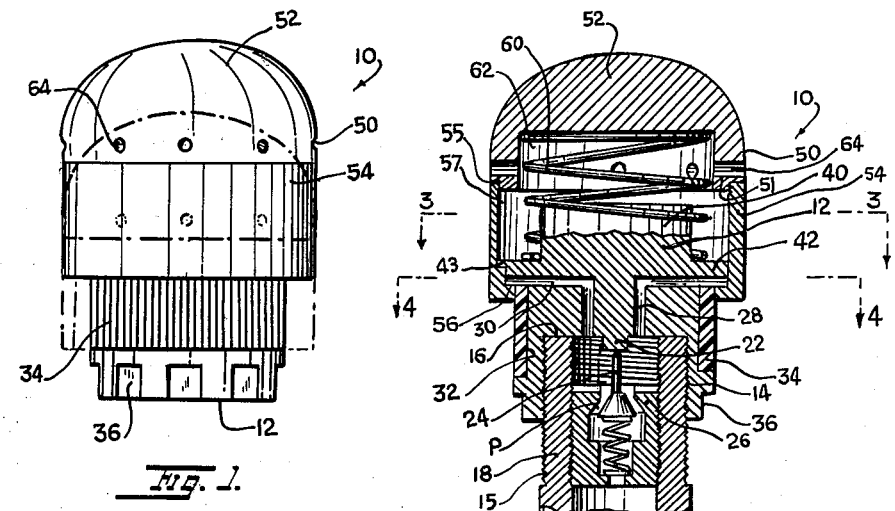
Fig. 2.
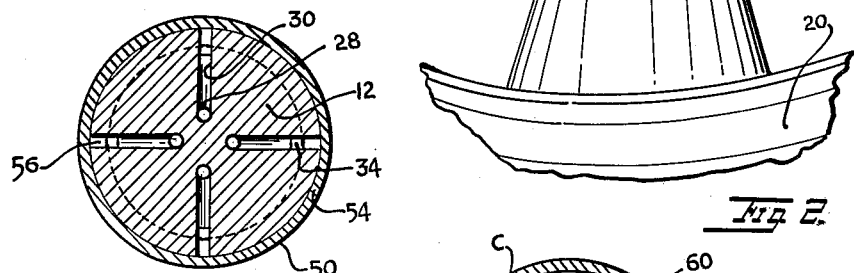
Fig. 4.     Fig. 3.
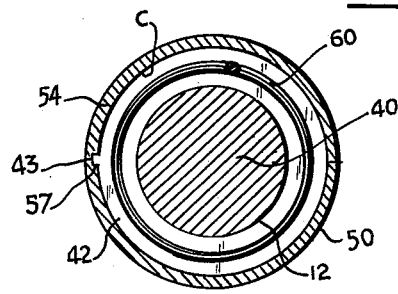
*INVENTOR.*
ALBERT SCHLANGER
BY
*ATTORNEY*

*INVENTOR.*
ALBERT SCHLANGER
*ATTORNEY*

United States Patent Office 3,106,183
Patented Oct. 8, 1963

3,106,183
VALVE CAP PRESSURE INDICATOR FOR TIRES
Albert Schlanger, 70—10 Parsons Blvd., Flushing, N.Y.
Filed Sept. 4, 1962, Ser. No. 221,283
4 Claims. (Cl. 116—34)

This invention relates to a pressure indicator for pneumatic tires and more particularly concerns a valve cap pressure indicator.

According to the invention there is provided a valve cap device for the valve stem of an inflatable pneumatic tire. The cap has a core which depresses the valve in the stem. On the core is a movable cover which is fully depressed on the core when pressure in the tire equals or exceeds a predetermined minimum pressure. If the air pressure in the tire falls below the predetermined minimum, the cover rises to expose a red colored band around the core. The cover is provided with apertures which are closed when tire pressure is above the set minimum but which are cleared when the tire pressure falls. Air passing through these holes as the tire rotates while in use causes a whistling sound which alerts the driver of a vehicle to the deflated condition of the tire. The cover may be provided with an adjustment screw for presetting the device to respond to predetermined minimum pressures.

It is therefore a principal object of the invention to provide a pressure indicator device for a pneumatic tire, the indicator being in the form of a valve cap having a movable cover for exposing a colored band to indicate a deflated condition of the tire.

A further object is to provide a pressure indicator device as described having apertures which are exposed when the tire is deflated for causing a whistling sound as the device is revolved in air.

Another object is to provide a pressure indicator as described having an adjustment screw and calibrated scale for presetting the indicator to respond to any selected minimum pressure.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of the pressure indicator device.

FIG. 2 is a sectional view of the device shown mounted on a valve stem of a tire.

FIG. 3 and FIG. 4 are sectional views taken on lines 3—3 and 4—4, respectively, of FIG. 2.

Figure 5:
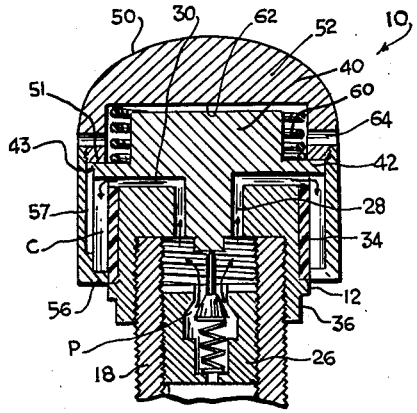
FIG. 5 is a sectional view of the device similar to part of FIG. 2, showing the position of the parts under pressure.

The device 10 as shown in FIGS. 1–5 includes a cylindrical core 12 which has an internally threaded bore 14 terminating at an annular shoulder 16. The shoulder 16 seats on the upper end of a valve stem 18 of a tire 20 as shown in FIGS. 2 and 5. The core is tightly screwed on top of the stem so that the thread of bore 14 engages the external thread 15 of the stem. The core has a depending axial stud 22 which depresses the movable spring biased member 24 of the air valve 26 to clear a passage P so that air in the tire passes upwardly to the core. The core has a plurality of circumferentially spaced axial bores or passages 28 which communicate with radial passages 30 as clearly shown in FIGS. 2, 4 and 5. The passages 30 open to the exterior of the core.

Around the core in a recess 32 is a resilient plastic sleeve or band 34 preferably colored red. The lower external end of the core may have lands 36 for engagement by a wrench to tighten the core on the stem 18. The core has an upper cylindrical extension 40 and an annular flange 42 extending radially outward just above the radial passages 30.

The cover 50 of the device has a closed dome-shaped top 52 and depending cylindrical skirt or wall 54 concentric with core 12. The skirt 54 and top 52 are screwed together at the upper end of the skirt where the skirt is internally threaded to engage external thread 55 of the dome. At its lower end the skirt 54 has a radially inwardly extending flange 56 aligned with flange 42 of the core. Between the flanges 56 and 42 is defined an annular chamber C into which air can enter from passages 30. Flange 42 has a radial finger 43 extending outwardly and engaging in a longitudinal groove 57 formed in the inner side of the skirt. This arrangement permits the cover to move axially with respect to the core without rotation around the core. Thus the device can be screwed on the valve stem by manually grasping the cover and turning the entire device. The core will turn with the cover. The radial flange 56 rather tightly but slidably engages the resilient sleeve or band 34 to form a leakproof seal therebetween.

A coil spring 60 is provided in the cover. The upper end of the spring is engaged in central internal recess 62 in the top 52. The lower end of the spring bears on top of flange 42. A plurality of holes 64 are formed in the top 52 and extend radially inwardly to open into recess 62.

FIGS. 1–4 show the device in expanded position when it is not under air pressure or when it is under air pressure below a predetermined pressure. The cover is elevated axially with respect to the core and flange 56 is in contact with flange 42 at the bottom of chamber C. The parts are held in this position by expanded spring 60. Holes 64 are exposed as core extension 40 is located below these holes. The colored band or sleeve 34 is exposed below the cover as clearly shown in FIGS. 1 and 2.

FIG. 5 shows the device subjected to air pressure from the tire. The air under pressure passes the valve and through passages 28, 30 to chamber C. There the air forces flanges 42 and 56 apart so that the cover is lowered until if pressure is sufficiently high flange 42 contacts the underside 51 of cover top 52. The finger 43 is located at the upper end of groove 57. If the air pressure is above a predetermined minimum pressure then the cover will be held in an intermediate position between those shown in FIGS. 2 and 5 as the air pressure of the tire is balanced by the resisting pressure of the spring 60.

Figure 6:
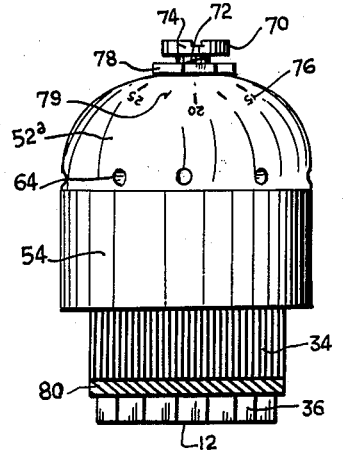
FIG. 6 is a side elevational view of another device according to the invention.
Figure 7:
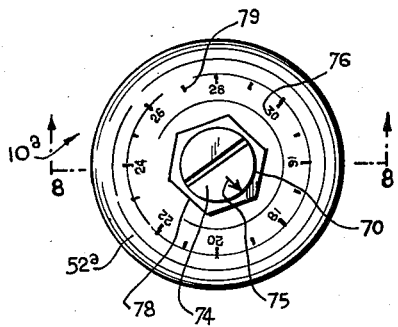
FIG. 7 is a top plan view of the device of FIG. 6.
Figure 8:
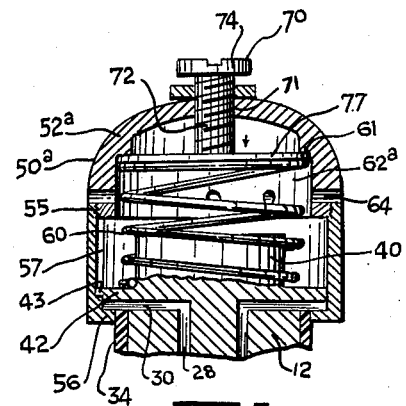
FIG. 8 is a fragmentary sectional view taken on line 8—8 of FIG. 7.

FIGS. 6–8 show another form of the invention in which the device 10ᵃ has an adjustment screw 70 whose threaded shank 72 is threadedly engaged in a threaded central bore 71 in the top 52ª of cover 50ª. The screw has a head 74 which can be turned by hand or tool. An index arrow or mark 75 is provided on the head and this arrow can be set to point at any one of numerals 76 of a calibrated pressure scale 79 on the upper end of the cover. A locknut 73 is provided on the shank 72 to lock the screw in any set position. The lower end of the screw carries a disk 77 which is movable in recess 62ª. The disk 77 bears on the upper end of spring 60. The disk is shown in uppermost position in FIG. 8 bearing on the underside of shoulder 61 in the recess. The device is set to respond to minimum pressure since the spring 60 is most lightly loaded.

If the screw 70 is turned clockwise as viewed in FIG. 7, then the disk 77 will move axially downward to compress the spring and loading it so that a higher air pressure will be required to depress the cover with respect to the core. At all pressures below a predetermined one the device will not respond. The cover will not move with respect to the core and the colored band 34 will be exposed. At a sufficiently high pressure indicated by the setting of arrow 75 at the scale on the cover, the cover will move down to completely cover the red band. The setting of adjustment screw is thus a critical one. At any lower pressure the red band is exposed either partially or fully indicating dangerous underinflation of the tire. A green band 80 may be provided below the red band. When only the green band is exposed, the tire is safely inflated. When any part of the red band 34 shows the tire is underinflated. At the same time that underinflation occurs the holes 64 in the cover are exposed as core extension clears the holes. A whistling sound will be caused as the tire carrying the device rotates at high speed in underinflated condition. The device thus provides both visual and audible indications of an underinflated condition.

The device considerably increases vehicle driving safety since it insures that the alert driver is instantly informed of an underinflated tire condition and can take proper immediate remedial measures, such as reinflating the tire to proper pressure.

The device is inexpensively manufactured. It is readily placed on the valve stem and removed therefrom. It keeps the valve stem clear and free from dust and dirt.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A valve cap pressure indicator for a pneumatic tire, comprising a cylindrical core tightly engageable at one end on a valve stem of said tire, said core having a projecting axial stud at said end for holding the valve in an open condition, a generally cylindrical cover concentric with said core and axially movable with respect to the core, a spring in said cover biasing the cover axially outward of the core, said core and cover having overlapping flanges defining an air chamber therebetween, and a resilient colored plastic sleeve around the core contacting the flange of the cover and sealing the chamber thereat, said core having a passage extending from said end to said chamber to pass air into the chamber for forcing the flanges apart when the air pressure in said chamber exceeds a predetermined pressure determined by tension in said spring so that the cover partially encloses said sleeve, said cover having a recess therein and holes communicating between the recess and the exterior of the cover, said core having a cylindrical extension extending into the recess and closing the holes when pressure in said chamber is greater than a certain critical pressure, said extension clearing the holes when pressure in said chamber is less than the critical pressure to cause a whistling sound as the tire rotates with the indicator.

2. A valve cap pressure indicator for a pneumatic tire, comprising a cylindrical core tightly engageable at one end on a valve stem of said tire, said core having a projecting axial stud at said end for holding the valve in an open condition, a generally cylindrical cover concentric with said core and axially movable with respect to the core, a spring in said cover biasing the cover axially outward of the core, said core and cover having overlapping flanges defining an air chamber therebetween, and a resilient colored plastic sleeve around the core contacting the flange of the cover and sealing the chamber thereat, said core having a passage extending from said end to said chamber to pass air into the chamber for forcing the flanges apart when the air pressure in said chamber exceeds a predetermined pressure determined by tension in said spring so that the cover partially encloses said sleeve, said cover having a recess therein and holes communicating between the recess and the exterior of the cover, said core having a cylindrical extension extending into the recess and closing the holes when pressure in said chamber is greater than a certain critical pressure, said extension clearing the holes when pressure in said chamber is less than the critical pressure to cause a whistling sound as the tire rotates with the indicator, an adjustment screw threaded in said cover, and a member carried by said screw and bearing on the spring to adjust the tension therein for determining the minimum air pressure in said chamber at which the cover will move with respect to the core.

3. A valve cap pressure indicator for a pneumatic tire, comprising a cylindrical core tightly engageable at one end on a valve stem of said tire, said core having a projecting axial stud at said end for holding the valve in an open condition, a generally cylindrical cover concentric with said core and axially movable with respect to the core, a spring in said cover biasing the cover axially outward of the core, said core and cover having overlapping flanges defining an air chamber therebetween, and a resilient colored plastic sleeve around the core contacting the flange of the cover and sealing the chamber thereat, said core having a passage extending from said end to said chamber to pass air into the chamber for forcing the flanges apart when the air pressure in said chamber exceeds a predetermined pressure determined by tension in said spring so that the cover partially encloses said sleeve, said cover having a recess therein and holes communicating between the recess and the exterior of the cover, said core having a cylindrical extension extending into the recess and closing the holes when pressure in said chamber is greater than a certain critical pressure, said extension clearing the holes when pressure in said chamber is less than the critical pressure to cause a whistling sound as the tire rotates with the indicator, means slidably and nonrotatably interengaging the core and cover so that the core can be engaged with the valve stem by grasping and turning the cover, an adjustment screw threaded in said cover and a member carried by said screw and bearing on the spring to adjust the tension therein for determining the minimum air pressure in said chamber at which the cover will move with respect to the core.

4. A valve cap pressure indicator for a pneumatic tire, comprising a cylindrical core tightly engageable at one end on a valve stem of said tire, said core having a projecting axial stud at said end for holding the valve in an open condition, a generally cylindrical cover concentric with said core and axially movable with respect to the core, a spring in said cover biasing the cover axially outward of the core, said core and cover having overlapping flanges defining an air chamber therebetween, and a resilient colored plastic sleeve around the core contacting the flange of the cover and sealing the chamber thereat, said core having a passage extending from said end to said chamber to pass air into the chamber for forcing the flanges apart when the air pressure in said chamber exceeds a predetermined pressure determined by tension in said spring so that the cover partially encloses said sleeve, said cover having a recess therein and holes communicating between the recess and the exterior of the cover, said core having a cylindrical extension extending into the recess and closing the holes when pressure in said chamber is greater than a certain critical pressure, said extension clearing the holes when pressure in said chamber is less than the critical pressure to cause a whistling sound as the tire rotates with the indicator, means slidably and nonrotatably interengaging the core and cover so that the core can be engaged with the valve stem by grasping and turning the cover, an adjustment screw threaded in said cover and a member carried by said screw and bearing on the spring to adjust the tension therein for determining the minimum air pressure in said chamber at which the cover will move with respect to the core, said cover having a calibrated scale thereon cooperating with an index mark on said screw for indicating numerically the tension in said spring, whereby the minimum pressure at which the colored sleeve will be wholly enclosed by the cover will be determined.

References Cited in the file of this patent

UNITED STATES PATENTS 1,288,370    Zimmerman  ------------ Dec. 17, 1918